United States Patent
Bent et al.

(10) Patent No.: US 9,940,037 B1
(45) Date of Patent: Apr. 10, 2018

(54) MULTI-TIER STORAGE ENVIRONMENT WITH BURST BUFFER MIDDLEWARE APPLIANCE FOR BATCH MESSAGING

(71) Applicant: EMC Corporation, Hopkinton, MA (US)

(72) Inventors: John M. Bent, Los Alamos, NM (US); Sorin Faibish, Newton, MA (US); Dennis P. J. Ting, Groton, MA (US); Percy Tzelnic, Concord, MA (US); Uday Gupta, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 104 days.

(21) Appl. No.: 14/580,546

(22) Filed: Dec. 23, 2014

(51) Int. Cl.
*G06F 12/00* (2006.01)
*G06F 3/06* (2006.01)

(52) U.S. Cl.
CPC .......... *G06F 3/0613* (2013.01); *G06F 3/0664* (2013.01); *G06F 3/0689* (2013.01)

(58) Field of Classification Search
CPC combination set(s) only.
See application file for complete search history.

(56) References Cited

U.S. PATENT DOCUMENTS

| | | | |
|---|---|---|---|
| 2007/0300009 A1* | 12/2007 | Rogers | G06F 3/0613 711/103 |
| 2012/0198152 A1* | 8/2012 | Terry | G06F 11/1092 711/114 |
| 2013/0227194 A1 | 8/2013 | Kannan et al. | |
| 2014/0351300 A1 | 11/2014 | Uppu et al. | |

OTHER PUBLICATIONS

Hock-Chuan, Chua, C++ Programming Language Pointers, References and Dynamic Memory Allocation, Apr. 2013.*
Scott Cassell, "Isilon is the Analytics in Place Storage Platform", Scott Cassell's Blog on Mar. 31, 2014.
Johann Lombardi et al., "DAOS Changes to Lustre", High Performance Data Division, Intel Apr. 17, 2013.

(Continued)

*Primary Examiner* — Gurtej Bansal
(74) *Attorney, Agent, or Firm* — Ryan, Mason & Lewis, LLP

(57) ABSTRACT

A multi-tier storage system is provided that employs a burst buffer middleware appliance for batch messaging. An exemplary multi-tier storage system comprises at least first and second storage tiers comprising storage for storing data; and at least one burst buffer appliance, wherein the at least one burst buffer appliance comprises an abstract storage interface comprising a software interface module that communicates with at least one persistent storage device in at least one of the first and second storage tiers, wherein the at least one persistent storage device provides a list application programming interface, wherein the software interface module provides a batch operation comprised of a plurality of individual operations to the at least one persistent storage device using an aggregated message. The batch operation optionally comprises a batch operation for processing metadata. A burst buffer appliance is also provided for implementing the batch messaging techniques described herein.

20 Claims, 5 Drawing Sheets

(56) References Cited

OTHER PUBLICATIONS

Bent et al., "Asynchronous Checkpointing with Message Passing to Burst Buffers" U.S. Appl. No. 13/931,940, filed Jun. 30, 2013.
Bent et al., "Parallel Storage System with Burst Buffer Appliance for Storage of Partitioned Key-Value Store Across a Purality of Storage Tiers", U.S. Appl. No. 14/143,749, filed Dec. 30, 2013.
Bent et al., "Sharded Reorganization Based on Dimensional Description in Sharded Storage Systems", U.S. Appl. No. 14/319,666, filed Jun. 30, 2014.
Bent et al., "Multi-Tier Data Storage Using Burst Buffer Appliance for Workload Transformation Based on Performance Characteristics of at Least One Tier", U.S. Appl. No. 14/479,351, filed Dec. 22, 2014.
Bent et al., "Key-Value Store with Internal Key-Value Storage Interface", U.S. Appl. No. 14/579,323, filed Dec. 22, 2014.

\* cited by examiner

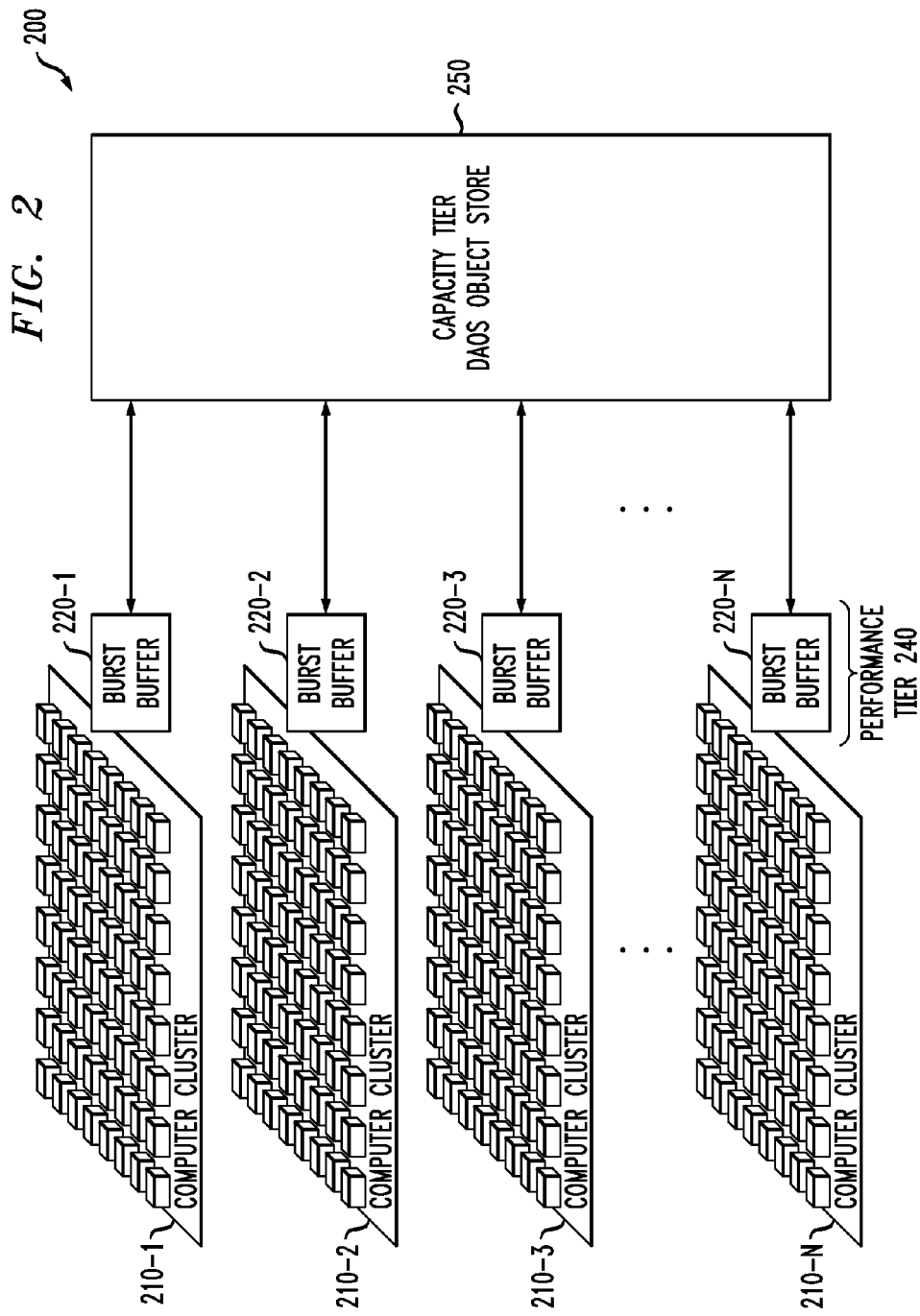

FIG. 3

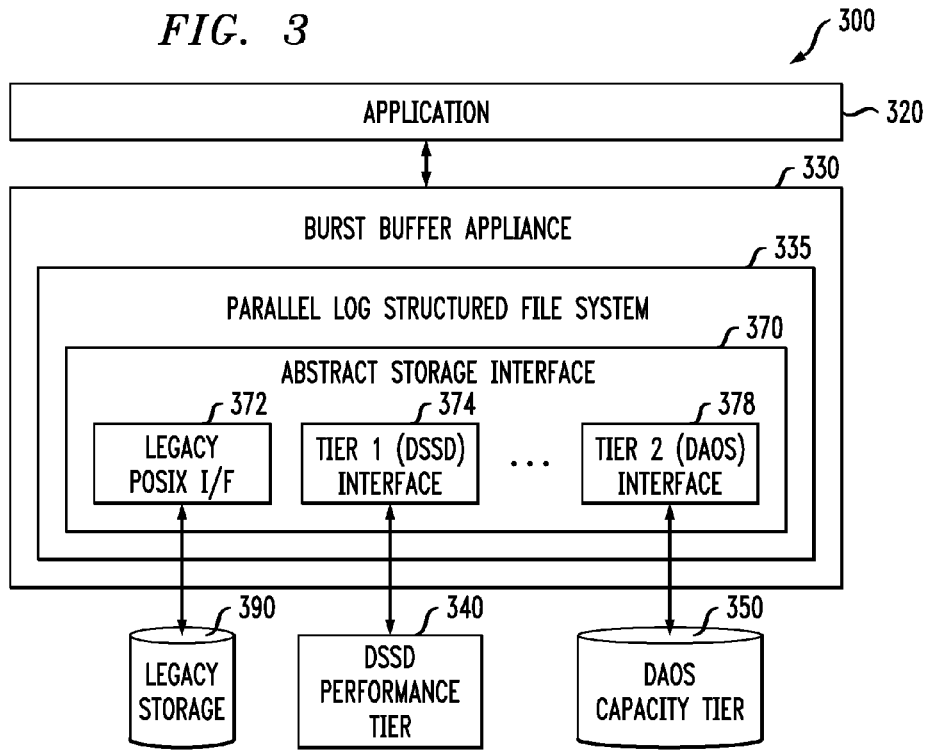

FIG. 4

```
// Existing PLFS virtual storage abstraction used for physical
storage of data and metadata:
class IOSHandle {
  private: virtual int Close(void)=0;
    friend int IOStore::Close(IOSHandle *handle);
  public:
    virtual int Fstat(struct stat *sb)=0;
    virtual int Fsync(void)=0;
    virtual int Ftruncate(off_t length)=0;
    virtual int GetDataBuf(void **bufp, size_t length)=0;
    virtual ssize_t Pread(void *buf, size_t nbytes, off_t offset)=0;
    virtual ssize_t Pwrite(const void *buf, size_t nbytes, off_t offset)=0;
    virtual ssize_t Read(void *buf, size_t offset)=0;
    virtual int ReleaseDataBuf(void *buf, size_t length)=0;
    virtual off_t Size(void)=0;
    virtual ssize_t Write(const void *buf, size_t nbytes)=0;
};
```

FIG. 5

```
// Extend Existing PLFS virtual storage abstraction to add new functions:
virtual ssize_t Pread_all(array[void *buf, size_t nbytes, off_t offset] ios, int count)=0;
virtual ssize_t Pwrite_all(array[const void *buf, size_t nbytes, off_t offset] ios, int count)=0;
virtual ssize_t Pwrite_metadata_all(array[const void *buf, size_t nbytes, off_t offset] ios, int count)=0;
virtual ssize_t Pread_metadata_all(array[const void *buf, size_t nbytes, off_t offset] ios, int count)=0;
```  ⎬ 510

```
// the implementation of Pread_all and Pwrite_all are different for each particular storage backend
// for systems that don't have list IO capability, such as a POSIX system, the implementation will look like this:
// the write call is similar
ssize_t POSIX->Pread_all(array[void *buf, size_t nbytes, off_t offset] ios, int count) {
    total = 0;
    for (i=0; i< count; i++) {
        total += read(ios[i].buf,ios[i].nbytes,ios[i].offset);
    }
    return total;
}
```  ⎬ 520

```
// for systems like DAOS that have a list API, then the implementation maps directly
// An upper layer converts large PLFS objects into a set of pieces of DAOS,
// using existing PLFS virtual storage abstraction (FIG. 4).
// Extend to leverage the list IO in some of the physical stores
// the write call is similar
ssize_t DAOS->Pread_all(array[void *buf, size_t nbytes, off_t offset] ios, int count) {
    return daos_read_all(ios,count);
}
```  ⎬ 530

```
// Metadata extension allows backends that have different levels
// of service to treat metadata more appropriately. Exemplary DSSD backend storage system
// that adds mirroring for reliability and converts metadata to use low latency KV operations
// read is similar except a load balancing technique is used to choose which mirror
ssize_t DSSD->Pwrite_metadata_all(array[metadata_type,metadata_value] metadata, int count) {
    for (i=0;i<count;i++) {
        mirror1->set_key(metadata[i].metadata_type,metadata[i].metadata_value);
        mirror2->set_key(metadata[i].metadata_type,metadata[i].metadata_value);
    }
    return count;
}
```

600

US 9,940,037 B1

MULTI-TIER STORAGE ENVIRONMENT WITH BURST BUFFER MIDDLEWARE APPLIANCE FOR BATCH MESSAGING

FIELD

The invention relates generally to data storage, and more particularly to batch messaging in parallel computing systems.

BACKGROUND

Parallel computing techniques are used in many industries and applications for implementing computationally intensive models or simulations. Metadata is additional data that describes the actual data. For example, metadata can be used in many parallel computing systems to describe where the corresponding data is stored. The amount of metadata produced creates a large number of small input-output (IO) requests for important information that cannot be lost. In a multi-tier storage environment, for example, the cost of multiple small IO operations for both data and metadata becomes increasingly prohibitive as the storage tiers become increasingly distant.

A need therefore exists for techniques for aggregating multiple input-output operations into batch network operations so that multiple input-output operations can be processed at once.

SUMMARY

Illustrative embodiments of the present invention provide a multi-tier storage environment that employs a burst buffer middleware appliance for batch messaging. In one embodiment, a multi-tier storage system comprises at least first and second storage tiers comprising storage for storing data; and at least one burst buffer appliance, wherein the at least one burst buffer appliance comprises an abstract storage interface comprising a software interface module that communicates with at least one persistent storage device in at least one of the first and second storage tiers, wherein the at least one persistent storage device provides a list application programming interface (API), wherein the software interface module provides a batch operation comprised of a plurality of individual operations to the at least one persistent storage device using an aggregated message.

In at least one exemplary embodiment, the batch operation comprises a batch operation for processing metadata. The batch operation for processing metadata optionally replicates the metadata on a plurality of storage nodes. In a further variation, the batch operation for processing metadata optionally processes the metadata using one or more key-value operations. The disclosed multi-tier storage system optionally supports a legacy persistent storage device that does not provide a list API by using the plurality of individual operations within the batch operation.

In a further exemplary embodiment, a burst buffer appliance is provided for use in a multi-tier storage system. The exemplary burst buffer appliance comprises a memory and at least one processing device configured to provide an abstract storage interface comprising a software interface module that communicates with at least one persistent storage device in the multi-tier storage system providing a list API, wherein the software interface module provides a batch operation comprised of a plurality of individual operations to the at least one persistent storage device using an aggregated message.

As noted above, illustrative embodiments described herein provide significant improvements relative to conventional storage arrangements. In some of these embodiments, use of a burst buffer appliance with a list API allows a multi-tier storage environment to leverage the list APIs provided by emerging storage devices and avoid the round trip cost of each individual input-output operation.

BRIEF DESCRIPTION OF THE DRAWINGS

FIG. 2 illustrates an exemplary embodiment of the parallel computing system of FIG. 1;

FIG. 3 illustrates an exemplary multi-tier storage environment incorporating aspects of the present invention;

FIG. 4 illustrates exemplary pseudo code for a conventional parallel log structured file system (PLFS) virtual storage abstraction used for physical storage of data and metadata; and FIGS. 5 and 6, collectively, illustrate exemplary pseudo code for a number of batch messaging operations incorporating aspects of the present invention.

DETAILED DESCRIPTION

Figure 1:
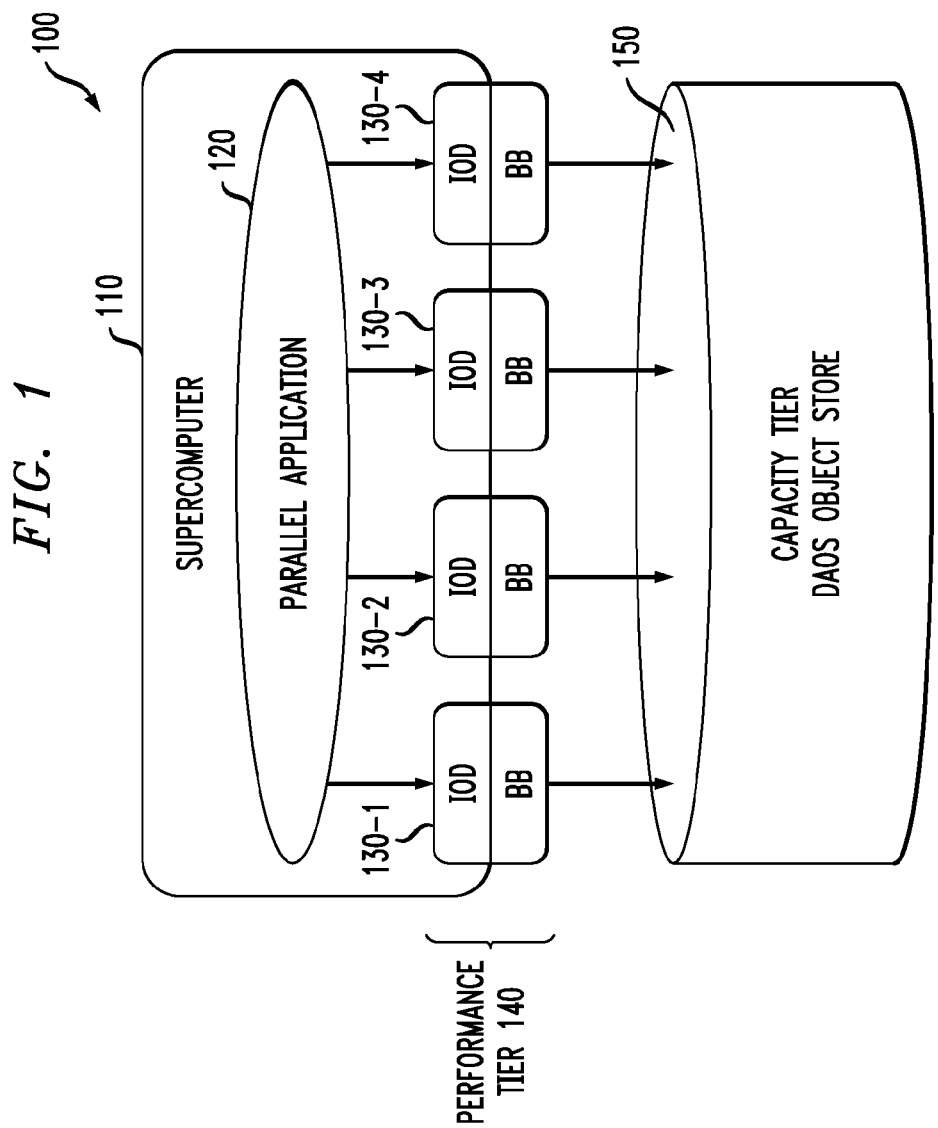
FIG. 1 illustrates an exemplary input-output architecture for a parallel computing system configured in accordance with an illustrative embodiment of the present invention.

Illustrative embodiments of the present invention will be described herein with reference to the storage of data generated by an exemplary parallel computing system and associated clients, servers, storage arrays and other processing and storage devices. It is to be appreciated, however, that the invention is not restricted to use with the particular illustrative parallel computing system and device configurations shown. Accordingly, the terms "parallel computing system" and "parallel file system," as used herein, are intended to be broadly construed so as to encompass, for example, distributed computing systems and other types of computing systems and related storage implemented by using one or more processing or storage devices.

Aspects of the present invention provide a multi-tier storage environment with a burst buffer middleware appliance that provides a list API. In one exemplary embodiment, a two-tier storage system comprises a first performance tier that employs memory based on performance considerations (e.g., access times) and a second capacity tier that employs storage based on capacity considerations. In this manner, the two-tier storage system balances between the relative costs of memory and other storage and their relative speeds. It is to be appreciated that more than two storage tiers may be used in other embodiments.

Aspects of the present invention provide a burst buffer middleware appliance with a list API for batch messaging. An exemplary burst buffer middleware appliance provides an abstract storage interface as a new storage layer to leverage knowledge of the storage destination, such as whether the storage destination provides a list API. List API operations are applied to the abstract storage interface, and then passed to one or more persistent storage devices providing a list API. As discussed herein, the exemplary abstract storage interface supports batch operations so that multiple input-output operations can be processed at once.

A number of emerging storage devices provide a list API, such as the DSSD™ flash storage system from EMC Corp. and the Distributed Application Object Storage (DADS) Object Store, commercially available from Intel Corp. The list APIs provided by the emerging storage devices allow multiple IO requests to be packaged into a single function and a single network message. In addition, storing key-value data (e.g., metadata) using a key-value interface that maintains the semantic information associated with the stored key-value data allows easier access to the metadata. See, for example, U.S. patent application Ser. No. 14/579,323, filed Dec. 22, 2014, entitled "Key-Value Store With Internal Key-Value Storage Interface," and incorporated by reference herein, for a discussion of key-value interfaces that maintain semantic information.

According to another aspect of the invention, a burst buffer middleware appliance is provided with an API that provides additional functions for special handling of metadata related to the stored data. For example, functions are provided to mirror metadata in the performance tier and/or the capacity tier to ensure that the valuable metadata is highly available.

The exemplary performance tier comprises a burst buffer appliance comprising a flash memory, such as a DSSD™ flash storage system, or other high-speed memory having a substantially lower access time than the capacity tier. Although flash memory will often be used for the high-speed memory of the burst buffer appliance, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer appliance," as used herein, is intended to be broadly construed so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients executing on compute nodes and a file system such as the capacity storage tier, for storing data associated with different types of IO operations.

The exemplary capacity tier may be implemented, for example, using a DAOS Object Store, commercially available from Intel Corp. While exemplary embodiments of the present invention are illustrated herein using multiple storage tiers comprised of a plurality of exemplary storage technologies, such as flash storage, other storage technologies can be employed in each tier, as would be apparent to a person of ordinary skill in the art.

FIG. 1 illustrates an exemplary input-output architecture 100 for a parallel computing system configured in accordance with an illustrative embodiment of the present invention. As shown in FIG. 1, the exemplary input-output architecture 100 comprises a parallel application 120 executing on a supercomputer 110, typically comprised of a plurality of compute nodes (not shown in FIG. 1). The parallel application 120 generates a storage workload that is processed by a plurality of burst buffer (BB) appliances 130-1 through 130-4 that each execute input-output dispatcher (IOD) software.

The storage workload or portions thereof can be stored by each burst buffer appliance 130 in a performance tier 140 comprised of flash memory associated with the corresponding burst buffer appliance 130 and/or in a capacity tier 150, in accordance with aspects of the invention. The exemplary capacity tier 150 is implemented as an exemplary DAOS Object Store.

FIG. 2 illustrates an exemplary implementation 200 of the input-output architecture 100 of FIG. 1. As shown in FIG. 2, the supercomputer 110 of FIG. 1 is implemented as a plurality of compute clusters 210-1 through 210-N, each comprised of a plurality of compute nodes. Each compute cluster 210 has an associated burst buffer appliance 220-1 through 220-N, for example, associated with one or more input-output nodes (ION) of the respective compute cluster 210. The exemplary performance tier 240 is implemented using the flash storage of the buffer appliances 220-1 through 220-N, such as a DSSD™ flash storage system, commercially available from EMC Corp. The exemplary capacity tier 250 is implemented using DAOS Object Stores. The different storage tiers 240 and 250 in this embodiment comprise different types of storage devices having different performance characteristics, and the two exemplary storage technologies may be varied in other embodiments.

The exemplary flash storage devices of the exemplary performance tier 240 are generally significantly faster in terms of read and write access times and generally otherwise perform better than the storage devices of the capacity tier 250, which typically provide greater overall capacity than the exemplary performance tier 240. Thus, the flash storage devices of the performance tier 240 generally provide higher performance than the storage devices of the capacity tier 250, but the storage devices of the capacity tier 250 generally provide higher capacity at lower cost than the flash storage devices. These storage tiers comprise respective disjoint subsets of storage. However, numerous alternative tiering arrangements may be used, including three or more tiers each providing a different level of performance. The particular storage devices used in a given storage tier may be varied in other embodiments and multiple distinct storage device types may be used within a single storage tier.

The exemplary tiering arrangement of FIG. 2 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the parallel computing system of FIGS. 1 and 2, leading to enhanced system performance relative to conventional arrangements, while additionally or alternatively providing an ability to achieve particular levels of performance at lower cost.

Each burst buffer appliance 220 in the present embodiment is assumed to comprise a flash memory or other high-speed memory having a substantially lower access time than the capacity tier 250. The burst buffer appliance 220 may optionally comprise an analytics engine, and may include other components. Thus, each exemplary burst buffer appliance 220 comprises a portion of the storage (for example, flash memory) for the performance tier 240.

Each burst buffer appliance 220 further comprises a processor coupled to a memory (not shown). The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein may be viewed as examples of what are more generally referred to as "computer program products" storing executable computer program code.

The processing circuitry of each burst buffer appliance 220 implements pseudo code discussed further below in conjunction with FIGS. 5 and 6.

In addition, each burst buffer appliance 220 further comprises a parallel log structured file system (PLFS), based on, for example, the teachings of John Bent et al., "PLFS: A Checkpoint Filesystem for Parallel Applications," Int'l Conf. for High Performance Computing, Networking, Storage and Analysis 2009 (SC09) (November 2009), incorporated by reference herein.

Each burst buffer appliance 220 may be implemented at least in part in the form of software that is stored in the memory and executed by the processor. Each burst buffer appliance 220 comprising a processor, a memory and network interface components as described above is an example of what is more generally referred to herein as a "processing device." Each of the devices described herein may similarly be implemented as a processing device comprising a processor, a memory and network interface components.

One or more burst buffer appliances 220-1 through 220-N are optionally configured to control movement of data between the storage devices of the performance and capacity tiers 240 and 250. Examples of such movement will be described below. Although flash memory will often be used for the high-speed memory of each burst buffer appliance 220, other types of low-latency memory could be used instead of flash memory, as noted above.

It should be noted with regard to the illustrative embodiments of FIGS. 1 and 2 that modifications may be made to one or more applications, processes or other system elements or components in order to achieve additional improvements. For example, a job scheduler or other similar component within the system 100 or 200 can also be modified so as to take full advantage of the improved storage tiering functionality.

FIG. 3 illustrates an exemplary multi-tier storage environment 300 incorporating aspects of the present invention. As shown in FIG. 3, an exemplary application 320 can read, write and/or query data, such as objects, byte ranges and/or key-value data in an exemplary performance tier 340, capacity tier 350, and/or a legacy storage device 390 using PLFS 335 software executing on a burst buffer appliance 330.

As noted above, one aspect of the invention modifies PLFS software 335 to add an abstract storage interface 370 (storage layer) that provides an internal interface for list API functions, into which list API operations are applied and then passed to one or more persistent storage devices in an exemplary performance tier 340 and/or capacity tier 350. In addition, the list API supports a legacy storage device 390 that does not provide list IO capability, as discussed further below in conjunction with FIG. 5. Exemplary pseudo code for the abstract storage interface 370 is discussed below in conjunction with FIGS. 5 and 6.

The abstract storage interface 370 provides a storage-specific interface for each type of storage destination that supports list API functions, and can therefore leverage knowledge about the specific storage destination to ensure that the list API functions are properly passed to the storage destination. Thus, the abstract storage interface 370 allows the exemplary multi-tier storage environment 300 to run in a variety of environments, such as POSIX, and to leverage additional storage architectures that provide list APIs, such as the DSSD™ flash storage system and the DAOS Object Store referenced above. The abstract storage interface 370 performs the necessary conversions/translations to leverage, for example, flash and object storage devices that provide list APIs. In this manner, the multi-tier storage environment 300 provides a list API between an application 320 and one or more additional storage devices in the exemplary performance tier 340 or capacity tier 350 having a list API.

While the exemplary embodiments of the present invention employ DSSD™ flash storage system and the DAOS Object Store platform, other storage devices that provide list APIs can be employed, as would be apparent to a person of ordinary skill in the art.

As shown in FIG. 3, the exemplary abstract storage interface 370 comprises a legacy POSIX interface (I/F) 372 for interacting with one or more legacy storage devices 390 (i.e., non-List API-aware stores such as simple POSIX file systems). In addition, the exemplary abstract storage interface 370 comprises a tier 1 (e.g., a DSSD-based performance tier) interface 374 for interacting with DSSD™ flash storage devices providing a list API in the exemplary performance tier 340, and a tier 2 (DAOS-based capacity tier) interface 378 for interacting with DAOS object storage devices providing a list API in the exemplary capacity tier 350.

While the exemplary embodiment employs flash memory as a high-speed memory, other types of low-latency memory could be used instead of flash memory. As noted above, such low-latency memories typically comprise electronic memories, which may be implemented using non-volatile memories, volatile memories or combinations of non-volatile and volatile memories.

FIG. 4 illustrates exemplary pseudo code 400 for a conventional PLFS virtual storage abstraction used for physical storage of data and metadata. As shown in FIG. 4, the exemplary pseudo code 400 identifies a number of functions supported by PLFS.

FIG. 5 illustrates exemplary pseudo code 500 for extending the conventional PLFS virtual storage abstraction of FIG. 4 to support additional list functions. As shown in FIG. 5, the exemplary pseudo code 500 comprises code 510 to support exemplary list functions, such as read and write functions (data and metadata), as well as specialized list functions for reading and writing metadata. Generally, each element of the array corresponds to a distinct input-output operation that is aggregated into the batch message.

In addition, the exemplary pseudo code 500 comprises code 520 to support a legacy storage device 390 (FIG. 3) that does not provide list IO capability, such as a POSIX system. Generally, the supported exemplary list functions are implemented for a legacy storage device 390 (FIG. 3) by using a "for" loop that generates an individual operation, such as a read operation, for each input-output operation listed in the array.

In addition, the exemplary pseudo code 500 comprises code 530 for each type of supported storage destination that supports list API functions and thereby leverages knowledge about the specific storage destination to ensure that the list API functions are properly passed to the storage destination. The list API operations that are applied to the list API functions are passed to the corresponding persistent storage devices in the performance tier 340 (FIG. 3) and/or capacity tier 350 (FIG. 3). As shown in FIG. 5 for an exemplary DAOS object store, the implementation 530 maps directly to leverage the list 10 in some of the physical stores.

FIG. 6 illustrates exemplary pseudo code 600 for extending the conventional PLFS virtual storage abstraction of FIG. 4 to support additional list functions for special handling of metadata related to the stored data. For example, the exemplary pseudo code 600 provides functions to mirror metadata in the performance tier and/or the capacity tier to ensure that the valuable metadata is highly available, and funtions to convert metadata to use low latency key-value operations.

CONCLUSION

It is to be appreciated that the particular operations and associated messaging illustrated in FIGS. 5 and 6 are exemplary only, and numerous other types of operations and messaging may be used in other embodiments.

It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the parallel computing system 100 and/or 200. Such components can communicate with other elements of the parallel computing system 100 and/or 200 over any type of network or other communication media.

As indicated previously, components of a multi-tier storage system as disclosed herein can be implemented at least in part in the form of one or more software programs stored in memory and executed by a processor of a processing device. A memory having such program code embodied therein is an example of what is more generally referred to herein as a "computer program product."

The computing systems 100 and 200 or portions thereof may be implemented using one or more processing platforms each comprising a plurality of processing devices. Each such processing device may comprise a processor, a memory and network interface components of the type described for burst buffer appliances 220 in FIG. 2.

As indicated above, batch messaging functionality such as that described in conjunction with FIGS. 5 and 6 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of parallel computing systems and associated clients, servers and other processing and storage devices that can benefit from the batch messaging functionality described herein. Also, the particular configurations of system and device elements shown in FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A multi-tier storage system, comprising:
at least first and second storage tiers comprising storage for storing data; and
at least one burst buffer appliance comprising a high-speed memory having a substantially lower access time than at least one of said first and second storage tiers, wherein said at least one burst buffer appliance further comprises an abstract storage interface comprising a software interface module that communicates with at least one persistent storage device in at least one of said first and second storage tiers, wherein said at least one persistent storage device provides a list application programming interface (API) that processes multiple input-output operations as a single function, wherein said software interface module of said at least one burst buffer appliance provides a batch operation that aggregates a plurality of individual input-output operations to said at least one persistent storage device using a single aggregated message, wherein at least one argument of said batch operation comprises an array having a plurality of elements, where each of said individual input-output operations corresponds to one element of said array, wherein said batch operation aggregates a plurality of metadata operations and wherein said batch operation processes metadata from said metadata operations using one or more key-value operations that process at least one key-value metadata element.

2. The multi-tier storage system of claim 1, wherein said abstract storage interface provides a storage-specific interface for a plurality of storage destination types.

3. The multi-tier storage system of claim 1, wherein said software interface module communicates with at least one persistent storage device that does not provide a list API using said plurality of individual operations within said batch operation.

4. The distributed storage system of claim 1, wherein the high speed memory of said burst buffer appliance comprises the first storage tier or is used to access the first storage tier and the second storage tier.

5. The distributed storage system of claim 1, wherein said software interface module of said at least one burst buffer appliance maintains semantic information associated with key-value data.

6. The multi-tier storage system of claim 1, wherein said batch operation for processing metadata replicates said metadata on a plurality of storage nodes.

7. The distributed storage system of claim 6, wherein the metadata is replicated on said first storage tier and said second storage tier.

8. A burst buffer appliance for use in a multi-tier storage system comprising at least first and second storage tiers comprising storage for storing data, said burst buffer appliance comprising:
a high-speed memory having a substantially lower access time than at least one of said first and second storage tiers; and
at least one hardware device configured to provide an abstract storage interface comprising a software interface module that communicates with at least one persistent storage device in said multi-tier storage system providing a list application programming interface (API)) that processes multiple input-output operations as a single function, wherein said software interface module of said at least one burst buffer appliance provides a batch operation that aggregates a plurality of individual input-output operations to said at least one persistent storage device using a single aggregated message, wherein at least one argument of said batch operation comprises an array having a plurality of elements, where each of said individual input-output operations corresponds to one element of said array, wherein said batch operation aggregates a plurality of metadata operations and wherein said batch operation processes metadata from said metadata operations using one or more key-value operations that process at least one key-value metadata element.

9. The burst buffer appliance of claim 8, wherein said abstract storage interface provides a storage-specific interface for a plurality of storage destination types.

10. The burst buffer appliance of claim 8, wherein said batch operation for processing metadata replicates said metadata on a plurality of storage nodes.

11. The burst buffer appliance of claim 8, wherein said software interface module communicates with at least one persistent storage device that does not provide a list API using said plurality of individual operations within said batch operation.

12. The burst buffer appliance of claim 8, wherein the high speed memory of said burst buffer appliance comprises the first storage tier or is used to access the first storage tier and the second storage tier.

13. The burst buffer appliance of claim 8, wherein said software interface module of said at least one burst buffer appliance maintains semantic information associated with key-value data.

14. A method performed by a burst buffer appliance in a multi-tier storage system comprising at least first and second storage tiers comprising storage for storing data, wherein the first storage tier comprises a high-speed memory having a substantially lower access time than the second storage tier, comprising:

providing, by said burst buffer appliance, an abstract storage interface comprising a software interface module that communicates with at least one persistent storage device in said multi-tier storage system providing a list application programming interface (API) that processes multiple input-output operations as a single function, wherein said burst buffer appliance comprises a high-speed memory having a substantially lower access time than at least one of said first and second storage tiers;

obtaining a batch operation that aggregates a plurality of individual input-output operations; and providing, by said software interface module of said at least one burst buffer appliance, said batch operation to said at least one persistent storage device using a single aggregated message, wherein at least one argument of said batch operation comprises an array having a plurality of elements, where each of said individual input-output operations corresponds to one element of said array, wherein said batch operation aggregates a plurality of metadata operations and wherein said batch operation processes metadata from said metadata operations using one or more key-value operations that process at least one key-value metadata element.

15. The method of claim 14, wherein said abstract storage interface provides a storage-specific interface for a plurality of storage destination types.

16. The method of claim 14, wherein said batch operation for processing metadata replicates said metadata on a plurality of storage nodes.

17. The method of claim 14, wherein said software interface module communicates with at least one persistent storage device that does not provide a list API using said plurality of individual operations within said batch operation.

18. The method of claim 14, wherein the high speed memory of said burst buffer appliance comprises the first storage tier or is used to access the first storage tier and the second storage tier.

19. The method of claim 14, wherein said software interface module of said at least one burst buffer appliance maintains semantic information associated with key-value data.

20. A tangible machine-readable recordable storage medium, wherein one or more software programs when executed by one or more processing devices implement the steps of the method of claim 14.

* * * * *